US006947157B1

(12) United States Patent
Fujita

(10) Patent No.: US 6,947,157 B1
(45) Date of Patent: Sep. 20, 2005

(54) PRINTER PROVIDED WITH COMMUNICATION DEVICE

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 845 days.

(21) Appl. No.: 09/343,513

(22) Filed: Jun. 30, 1999

(30) Foreign Application Priority Data

Jul. 8, 1998 (JP) ............................................ 10-192882

(51) Int. Cl.⁷ .......................... G06F 13/00; G06K 15/02
(52) U.S. Cl. ..................................... 358/1.15; 358/1.13
(58) Field of Search ........................ 358/1.15; 395/615; 709/218, 203, 224, 217; 710/7–11, 19, 31, 33–36

(56) References Cited

U.S. PATENT DOCUMENTS 6,061,700 A * 5/2000 Brobst et al. ................ 707/517
6,091,508 A * 7/2000 Love et al. ................. 358/1.15

FOREIGN PATENT DOCUMENTS

| EP | 844 573 A | 5/1998 |
| WO | WO 98 20411 A | 5/1998 |

OTHER PUBLICATIONS

"Pipeline's Internet Printing System Lets the Printer Surf the Web", Hard Copy Observer, Lyra, Newton, Highlands, MA, US; vol. 6, No. 9, Mar. 1997, pp. 45, 24–26, XP002935645.

* cited by examiner

Primary Examiner—Douglas Tran
(74) Attorney, Agent, or Firm—Sughrue Mion, PLLC

(57) ABSTRACT

A printer comprises a telephone device and a printing device for printing information acquired by the telephone device as an image. The printer further comprises a memory for storing connection information required for communicating with external web sites. The telephone device communicating with the external web sites using the connection information to acquire and then display/print the information.

6 Claims, 5 Drawing Sheets

FIG. 3

| DAY: XX   MONTH: YY | TODAY'S WEATHER |

TODAY'S MENU

| INPUT NUMBER | INFORMATION CONTENTS |
|---|---|
| # 1 | ABC NEWSPAPER |
| # 2 | WEEKLY OPQ |
| # 3 | XYZ SUPERMARKET TODAY'S RECOMMENDATION |
| ⋮ | |
| # 0 | DETAILED MENU |
| # * | USUAL SET |

PRINTER PROVIDED WITH COMMUNICATION DEVICE

BACKGROUND OF THE INVENTION

The present invention relates to a printer provided with a communication device.

To select and acquire desired image data from a web site desired by a user in a case where an image provided from an information site and others on a network is printed using a printer, a communication terminal such as a personal computer is required. A communication terminal sends image data selected and acquired using communication means thereof or image data generated by the communication terminal per se to a printer, the printer executes predetermined processing for an image to be printed and prints it.

As described above, as a printer per se is not provided with a function for selecting and acquiring image data, a simplex printer has little utility value and a communication terminal for communication such as a personal computer is required to be separately prepared. If image data is acquired from an external information site utilizing a telephone line originally laid at home and others, the telephone line is occupied by a communication terminal during communication for the acquisition and a user cannot use make a phone call. The above is one cause which prevents a printer from being popularized particularly at a general home. Generally, it is difficult to say that the operation of a communication terminal (particularly the connecting operation to the communication network) and a printer is extremely simple as the handling of a television set and a telephone set. It is extremely important as the merchandise strategy of an enterprise that the operation of the above equipment is as much simplified as possible to reduce the load of a user and multiple functions are mounted on a simplex machine to enhance the added value of merchandise.

SUMMARY OF THE INVENTION

Therefore, the object of the present invention is to provide a printer for acquiring and printing a print image desired by a user singly by as simple operation as possible.

A printer according to the present invention is provided with a communication device for communicating with a web site on a network, selecting arbitrary information out of information on the web site and acquiring the selected information and a printing device which can print out a print image acquired using the communication device.

In a preferred embodiment, a printer is provided with a memory for storing connection information required for communicating with a web site providing an image to be printed, such as the telephone number of the web site or the telephone number of a provider for providing communication connection service to the Internet and a uniform resource locator (URL) of the web site in a case where the web site is on the Internet. Hereby, a user is not required to execute operation for inputting a telephone number and others to acquire a print image and a printer automatically communicates with the web site.

In a preferred embodiment, a menu site provided with a menu image on which the menu items of information to be provided to a user are listed exists on the web site. A printer can communicate with an information site storing information corresponding to the above menu items by accessing to the menu site. Hereby, a user can select information to be acquired referring to the menu image.

In a preferred embodiment, the printer is provided with a display for displaying the print image acquired using the communication device. Hereby, a user does not request the print image to be printed in a case where the acquired print image has only to be referred on the display.

In a preferred embodiment, the printer is provided with a ten-key panel provided with a display screen. A user can input various instructions to the printer using the ten-key panel.

BRIEF DESCRIPTION OF THE DRAWINGS

In the accompanying drawings:

FIG. 3 shows an example of a menu;

DETAILED DESCRIPTION OF THE PREFERRED EMBODIMENTS

Figure 1:
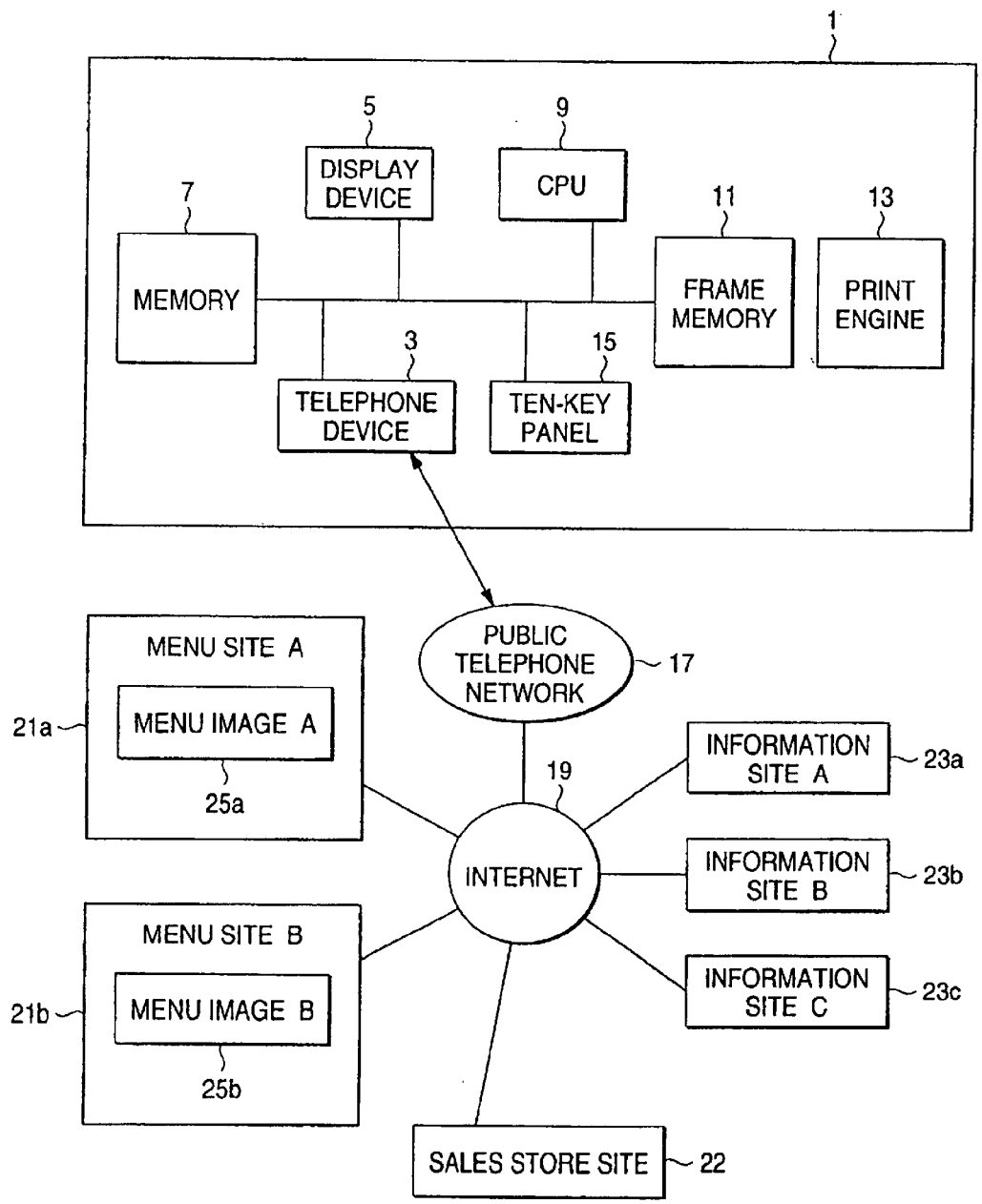
FIG. 1 is a block diagram showing the whole of a printer according to an embodiment of the present invention.

FIG. 1 is a block diagram showing a printer equivalent to an embodiment of the present invention.

This printer 1 is provided with a telephone device 3, such as a personal handyphone system (PHS) device, and can communicate with various sites 21a, 21b, 22, 23a, 23b, 23c, . . . respectively existing on an Internet 19 via a public telephone network 17 without using a telephone line which has been originally laid. Of the above sites, there are information sites 23a, 23b, 23c, . . . for providing various information such as a news item, a direct mail and a picture. There are also menu sites 21a and 21b respectively provided with a menu image 25a and 25b on which the menu items of the information of an information site with which a user contracts beforehand are listed. Further, there is a web site 22 of a sales store of this printer 1. In FIG., 1, the public telephone network 17 is connected to various sites 21a, 21b, 22, 23a, 23b, 23c, . . . via the Internet 19, however, the public telephone network 17 and various sites 21a, 21b, 22, 23a, 23b, 23c, . . . may be also directly connected.

The printer 1 stores URLs of the menu sites 21a and 21b and the telephone number of a provider for providing communication connection service to the above sites in an internal memory 7 (naturally, the printer may also store URLs of the other sites 22, 23a, 23b, 23c, . . . ) and the telephone device 3 can communicate with the desired menu site 21a or 21b using the telephone number and the URL and can download a menu image. If the public telephone network 17 and the menu sites 21a, 21b, . . . are directly connected, the telephone device 3 can communicate using only the telephone number of the menu site 21a or 21b.

The printer 1 is provided with a display device 5 for displaying a menu image downloaded from the menu site 21a or 21b. In place of the above display device 5, a display adapter for connecting to an external display may be also provided or a video output terminal for outputting to an external television receiver may be also provided.

Further, the printer 1 is provided with a CPU 9 for controlling the telephone device 3 and executing printing processing for printing downloaded data, a ten-key panel 15 for a user to operate the telephone device 3 such as the input of a telephone number, to select a menu item on a menu image and to instruct printing, a frame memory 11 to which print image data generated by the CPU 9 is stored, a print engine 13 for reading print image data from the frame memory 11 and printing it on paper and others.

When a menu image is downloaded to the printer 1 from the menu site 21a or 21b via the telephone device 3, the menu image is stored in the memory 7 and is displayed on the display device 5. The menu image is composed of the hyper text markup language (HTML) for example, information provided from the information sites 23a, 23b, 23c, . . . is displayed as a menu item on the menu image and the URL of each information is specified for each menu item. A user operates the ten-key panel 15 and can select a desired menu item on a menu screen. Then, the telephone device 3 communicates with the information site 23a, 23b, or 23c, . . . having URL of the selected menu item and the information of the selected menu item is downloaded to the printer 1. The downloaded information is stored in the memory 7 and is displayed on the display device 5. In this process, the CPU 9 converts the downloaded menu image and the selected information to image data automatically or in response to a printing instruction from a user and writes the image data to the frame memory 11. The print engine 13 reads out the image data from the frame memory 11 and prints it on paper.

In case failure occurs or the residual quantity of consumable supplies such as ink and paper is small, the printer 1 can automatically communicate with the sales store site 22 via the telephone device 3 in order to ask repair or can order consumable supplies.

Figure 2:
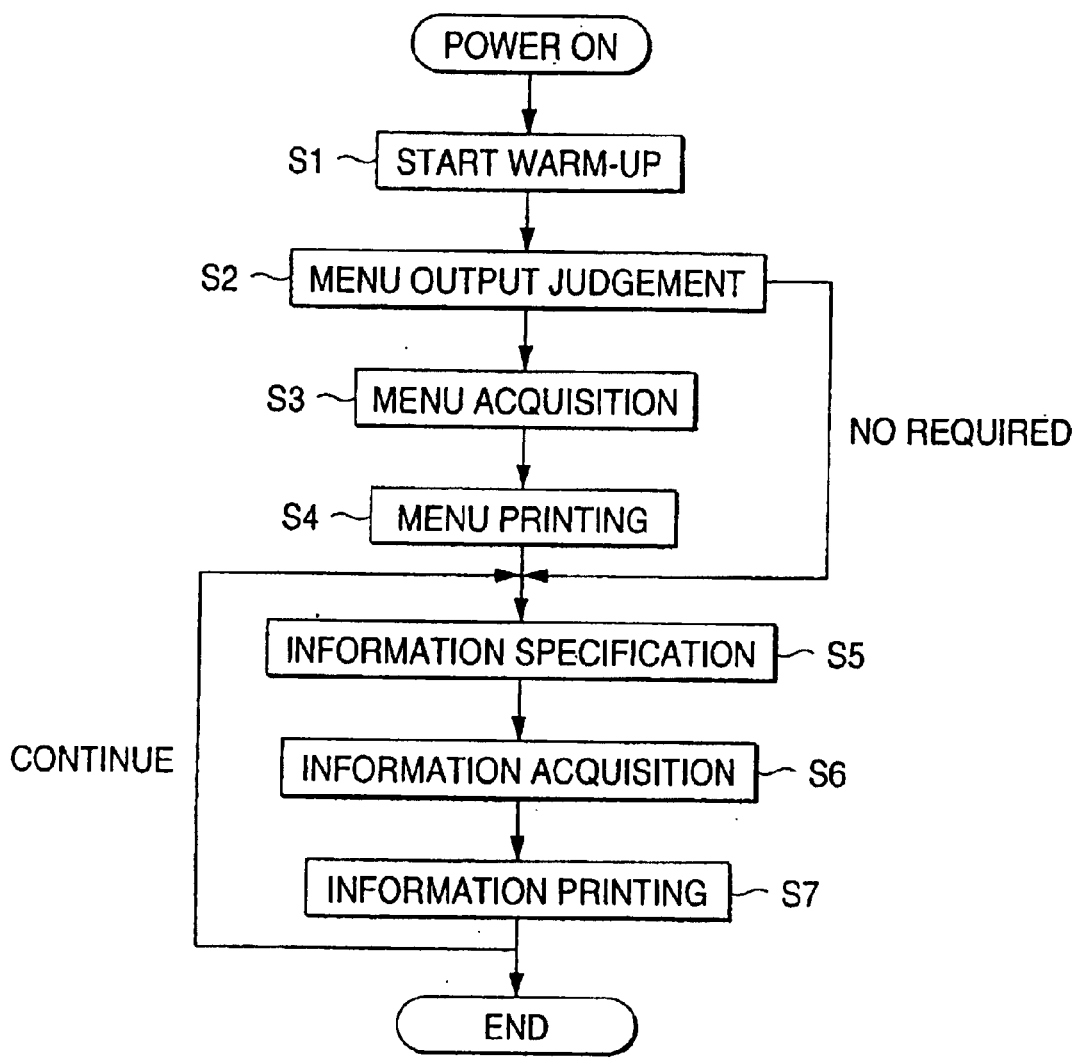
FIG. 2 is a flowchart showing an example of the whole processing of the printer according to the present invention.

FIG. 2 concretely shows a procedure of the operation of the printer 1.

When a user powers on the printer 1, the printer 1 starts warm-up in S1.

Next, processing proceeds to a menu output judgment step S2 and it is judged whether a menu output is required or not. For example, the output frequency of the menu is determined as once a day or once a week, if the menu is never output for a predetermined period, it is judged that output is required and if the menu is output, it is judged that output is not required. If the user requests the output of the menu using the ten-key panel 15, it is judged that output is required. If plural menu sites exist, the above judgment is executed every menu site. As a result of the above judgment, the menu the output of which is required is acquired in S3.

In the menu acquiring step S3, when the telephone device 3 communicates with the menu site 21a or 21b using a telephone number and the URL registered in the memory 7, the CPU 9 downloads a menu image. The printer 1 stores the downloaded menu image in the memory 7 and displays it on the display (does not display it in a case where the printer has no display).

Next, the processing proceeds to a menu printing step S4. The CPU 9 converts the downloaded menu image to a print image and sends the print image in the frame memory to the print engine 13. The print engine 13 prints out the print image. If the menu image is displayed on the display, the menu printing step S4 may be also omitted. As for the menu, the menu items of various information and an item number allocated to each menu item are displayed as shown in FIG. 3. The user can see what information he/she can roughly acquire by referring to the menu and if there is desired information, the user can see its item number for acquiring the desired information. In the memory 7, URL of information corresponding to each item number is stored.

Next, processing proceeds to an information specification step S5. In the step, the user inputs the item number of a desired menu item using the ten-key panel 15 to select the desired menu item on the menu image displayed on the display (in place of inputting the item number, the user may also select a menu item by moving a cursor). Or if the menu image is printed, the user inputs an item number by the similar operation referring to the printed menu.

In an information acquisition step S6, the telephone device 3 communicates with an information site such as the web site 23a for providing information using the URL and the telephone number of a provider respectively provided with the information selected by the user and downloads the information. Menus acquired from different menu sites are information from different information sites even if the same item number is allocated to the menus. Therefore, the telephone device 3 communicates with a different information site corresponding to the item number of each menu. In an information printing step S7, the CPU 9 converts the image of downloaded information to a print image and sends the print image in the frame memory to the print engine 13. The print engine 13 prints out the print image.

When the printing of information is finished, processing is again returned to the information specification step S4 and waits for the user's input of an item number. If the user wants to acquire further another information, he/she may also input an item number continuously and if not, he/she may also terminate the operation. If a menu on another menu site is to be referred of plural menu sites, processing is returned to the step before the menu is acquired and the similar operation to the above has only to be executed again.

FIG. 3 shows an example of a menu.

A menu is created by a manager and others of a menu site and is generally updated every day, however, according to conditions, an interval of updating may be also reduced or conversely, may be also extended. The creator of a menu may also prepare menus different in an interval of updating (for example, a today's menu and this month's menu) and may also provide both menus according to the desire of a user. A menu may be also composed hierarchically and the further detailed menu of a specific menu may be also printed. For example, in FIG. 3, in a case where a user wants to acquire more detailed information regarding "ABC NEWSPAPER", the user first inputs the item number "#1" of "ABC NEWSPAPER" first, second inputs the item number "#0" of "DETAILED INFORMATION", and finally presses a "MENU/PRINT" key. If information to be acquired is regularly determined, operation for acquiring the information may be also registered on a dedicated record medium in the printer beforehand to automatically acquire desired information only by inputting the item number "#*" of "USUAL SET" and pressing the "MENU/PRINTING" key. As operation becomes simple if a user can know the item number soon in case the user wants to acquire the same type of information continuously or wants to delete specific information in plural groups of information registered in the "USUAL SET", the item number of the information may be also printed on paper on which various information is printed.

Figure 4:
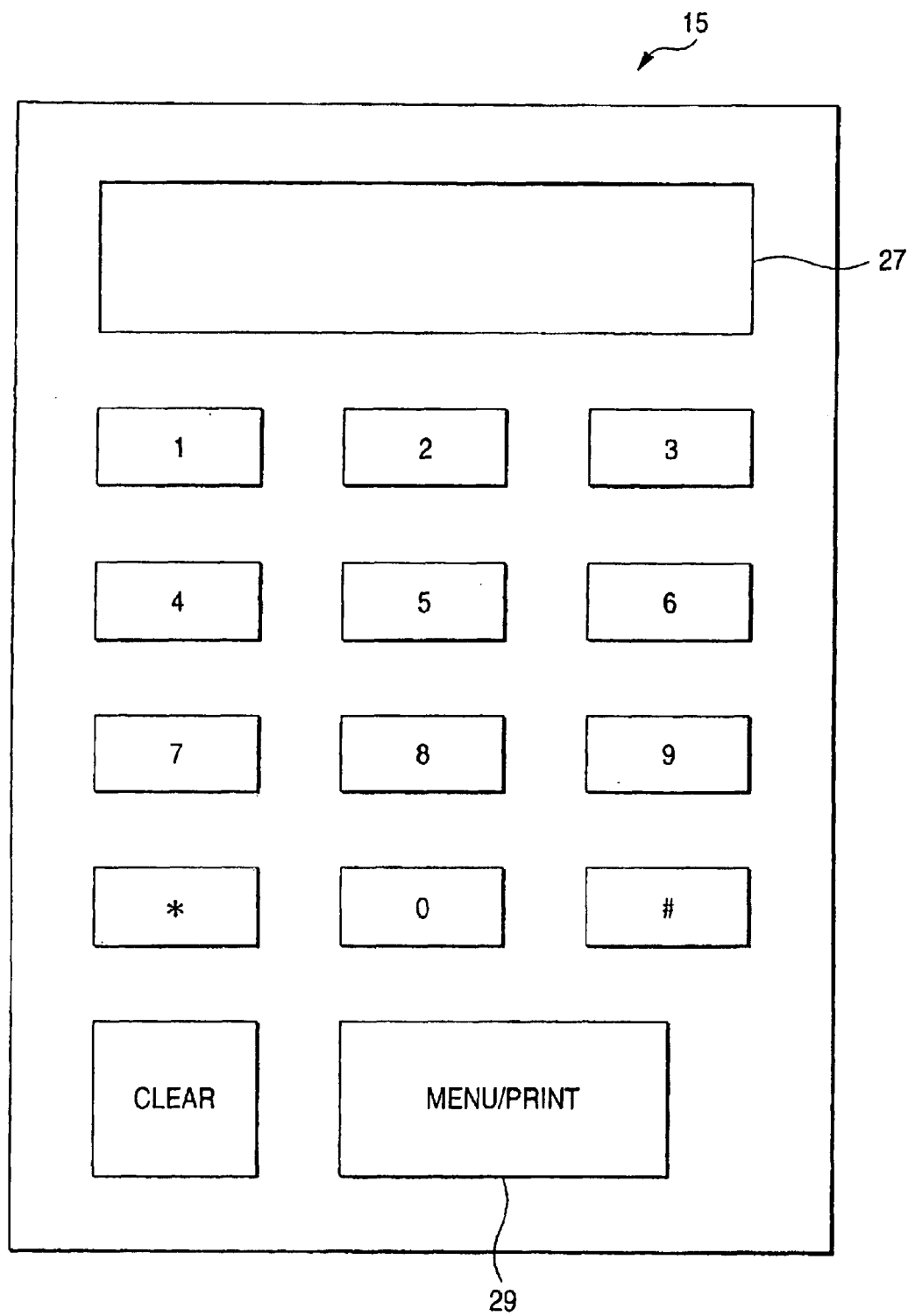
FIG. 4 shows an example of a ten-key panel.

FIG. 4 shows an example of the ten-key panel.

It is desirable that a user can operate the ten-key panel as simply as possible. The ten-key panel is provided with a simple display screen 27 and on the display screen, a message for explaining a procedure for a user to operate is displayed or an item number input by a user is displayed. Further, a voice message handler not shown may be also provided to explain a procedure for a user to operate in voice. A user can operate interactively by using the above display screen and the above voice message handler.

Figure 5:
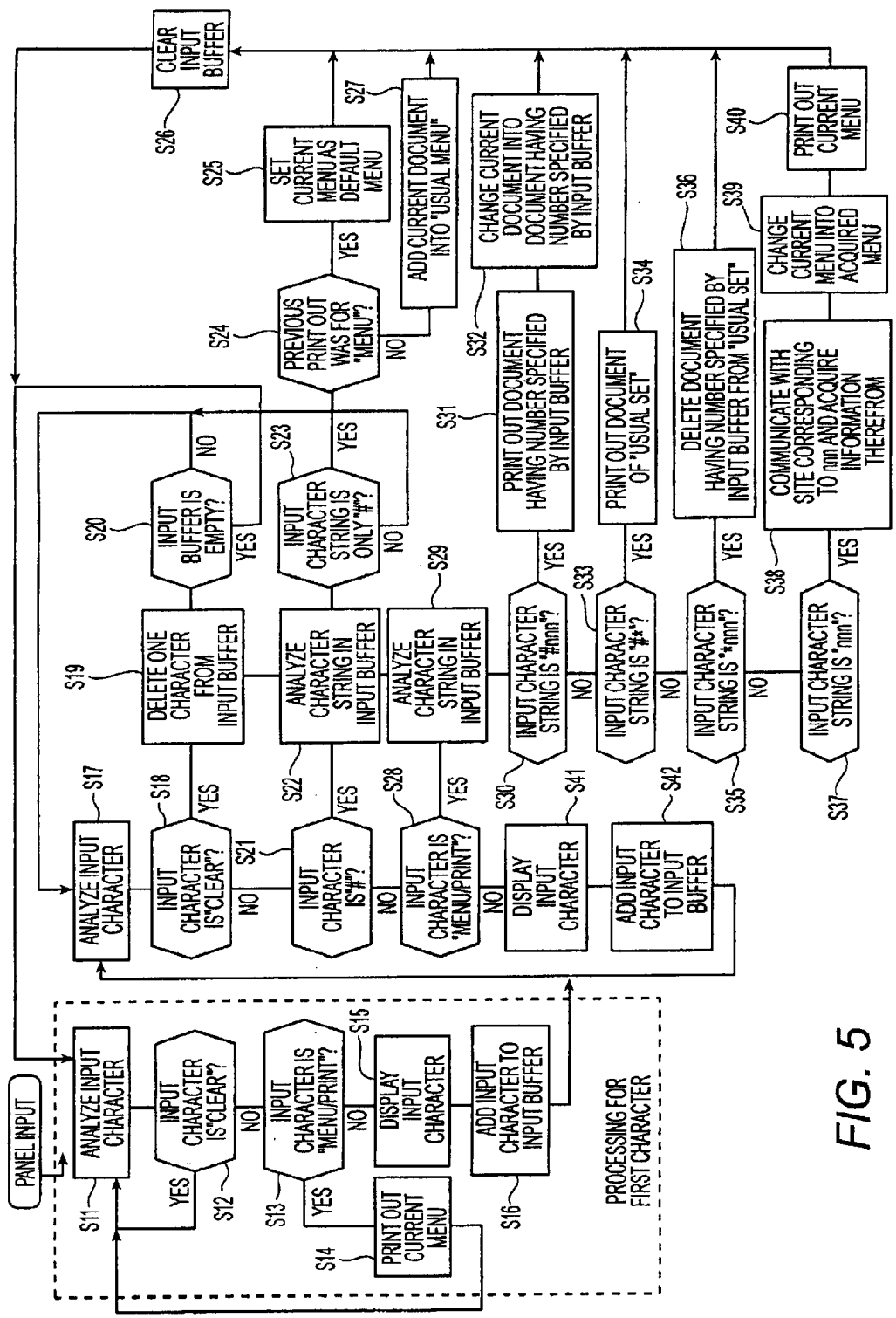
FIG. 5 is a flowchart showing the flow of the processing of the printer corresponding to input from the panel by a user.

FIG. 5 shows the flow of the processing of the printer corresponding to input on the panel by a user.

To print a menu, a user presses the "MENU/PRINTING" key 29 in S13 and S14. When information acquired from a web site is to be printed, a user inputs its item number next to "#" in S15, S16, S41 and S42 and presses the "MENU/PRINTING" key 29 in S28 to S32. When the "USUAL SET" is to be printed, a user inputs "#*" in S15, S16, S41 and S42 and presses the "MENU/PRINTING" key 29 in S28, S29, S33 and S34. When a menu on another menu site is to be printed, a user inputs the telephone number of a provider and the URL (or the telephone number) of the menu site in S15, S16, S41 and S42 and presses the "MENU/PRINTING" key in S28, S29 and S37 to S40. When specific information is to be registered in a "USUAL SET", a user inputs "##" after the information to be registered is printed in S15, S16, S21 to S24 and S27. When specific information is to be deleted from the "USUAL SET", a user inputs its item number next to "*" in S15, S16, S41 and S42 and presses the "MENU/PRINTING" key in S28, S35 and S36. When a menu site is to be changed, a user inputs "##" in S15, S16 and S21 to S25 after the menu of a new menu site is printed.

As described above, as the printer 1 can acquire a print image without using a telephone line originally laid by being provided with the telephone device 3, a user is not required to prepare a dedicated line. As a telephone charge can be separately accounted, a menu provider can also pay a telephone charge only when the printer communicates with the menu site 21a or 21b to acquire a menu for example. Further, when the printer is powered on, it becomes ready soon without requiring complicated operation for communication connection.

The preferred embodiment of the present invention is described above, however, the above embodiment is an example for the explanation of the present invention and the range of the present invention is not limited to only this embodiment. This supplier can also implement the present invention in various another embodiments in which the above embodiment is variously transformed, improved, corrected and simplified without deviating from the outline of the present invention. For example, the communication device with which the printer according to the present invention is provided is not limited to PHS, may be also a cellular telephone and a normal cable line may be also used. If the menu sites 21a and 21b themselves store information high in the degree of a demand by predetermined quantity, the above information sites are not required to be accessed and the information can be promptly provided. Not only various information is provided in response to the request of information from a user but information provided to a user only from the side of the web sites 21a, 21b, 22, 23a, 23b and 23c may be also prepared. For example, the telephone number of the menu site 21a or 21b may be changed and in that case, the menu site 21a or 21b has only to send connection information such as a new telephone number to the printer 1 to change menu site connection information stored in the memory 7. Hereby, the connection information of the menu site 21a or 21b can be changed without troubling a user. Further, when the printer 1 is moved for a move of a user, connection information stored in the memory 7 may be also changed to the connection information of the nearest menu site. Also, a user specifies the predetermined type of information beforehand, each site 21a, 21b, 22, 23a, 23b, and 23c may also automatically communicate with the printer every time each site acquires the specified information and may also provide the information to the user.

What is claimed is:

1. A printer comprising:
   a communication device for communicating with an external web site, selecting arbitrary information out of information on the web site in accordance with a user's request and acquiring the selected information;
   a printing device for printing the information acquired by the communication device as an image; and
   means for selecting a menu item out of the menu item list showing information to be provided to the user on a menu image provided on a menu site, the menu image acquired by the communication device,
   wherein the communication device can connect to a web site having information corresponding to menu item selected by the user out of the menu item list.

2. A printer comprising:
   a communication device for communicating with an external web site, selecting arbitrary information out of information on the web site in accordance with a user's request and acquiring the selected information;
   a printing device for printing the information acquired by the communication device as an image; and
   a display device for displaying the image of the information acquired by the communication device.

3. A printer comprising:
   a communication device for communicating with an external web site, selecting arbitrary information out of information on the web site in accordance with a user's request and acquiring the selected information;
   a printing device for printing the information acquired by the communication device as an image; and
   a ten-key panel provided with a display screen for inputting the user's request to the printer with reference to an image displayed on the display screen,
   wherein the image displayed contains information acquired by the communication device.

4. A image output method of a printer comprising the steps of:
   communicating with a menu site provided with a menu image on which menu items associated with information to be provided to a user are listed;
   acquiring the menu image;
   either displaying or printing the menu image;
   communicating with a web site having information associated with a menu item selected information by the user out of the menu image;
   acquiring the selected information; and
   either displaying or printing the selected information,
   wherein the communicating steps and acquiring steps are executed by a communicating device disposed in the printer.

5. A computer-readable recording medium including a computer program for the purpose of causing a computer to execute an image output method of a printer, the method comprising the steps of:
   communicating with a menu site provided with a menu image on which menu items associated with information to be provided to be a user are listed;
   acquiring the menu image;
   either displaying or printing the menu image;
   communicating with a web site having information associated with a menu item selected information by the user out of the menu image;

acquiring the selected information; and either displaying or printing the selected information, wherein the communicating steps and acquiring steps are executed by a communicating device disposed in the printer.

6. The printer as set forth in claim 2, further comprising:
an operating member for inputting the user's request to the printer with reference to an image displayed on the display device.

* * * * *